Inventors:
Roland E. Miller,
Raymond G. Rudnik,

Feb. 2, 1960   R. E. MILLER ET AL   2,923,114
PACKAGING APPARATUS
Filed April 15, 1957   9 Sheets-Sheet 9

Fig. 14.

United States Patent Office 2,923,114
Patented Feb. 2, 1960

2,923,114

PACKAGING APPARATUS

Roland E. Miller, Orangeville, and Raymond G. Rudnik, Homewood, Ill., assignors to National Dairy Products Corporation, a corporation of Delaware Application April 15, 1957, Serial No. 652,764

4 Claims. (Cl. 53—112)

This invention relates to the packaging of cheese and is more particularly concerned with apparatus for treating wrapped and packaged units of cheese, wherein the units are each enclosed within a thin flexible wrapper and then a plurality of the units are packaged in a carton, so as to substantially completely extract air from the wrapped cheese and the carton.

According to the present invention vacuum and pressure are employed to simultaneously effect intimate adhesion of wrappers to a plurality of wedges or other units of cheese and to evacuate air from the wrapped units and the carton containing a plurality of such units.

This general procedure of utilizing a combination of vacuum and pressure to evacuate air from food packages and the like is a known procedure, and the present invention relates particularly to a novel form of apparatus for accomplishing such purpose and which is especially adapted to apply vacuum and pressure to a plurality of wrapped cheese units for the aforesaid purpose.

The main objects of the invention are to provide novel and highly efficient apparatus of the character indicated, which is adapted to evacuate substantially all the gases from a carton containing a plurality of wrapped units; to provide such an apparatus which is adapted to effect the sealing of the carton after the gases are evacuated from the wrapped units; and to provide such apparatus of semi-automatic character so that it is well adapted for use in connection with both small and large volume production of packaged units. It is further intended to provide such apparatus by which wrapped cheese units can effectively be subjected to the action of vacuum and pressure, while in a carton in which a plurality of the units may be shipped to a customer, without damaging the wrapped cheese units. Moreover, it is an object of this invention to provide apparatus of the character indicated which is of relatively simple and correspondingly low cost construction.

Other objects and advantages of the invention will be understood by reference to the following specification and accompanying drawings (9 Sheets), wherein a selected embodiment of the invention is described and illustrated.

In the drawings:

Figure 11 is an enlarged sectional view taken along the line 11—11 of Figure 6;

Figure 1:
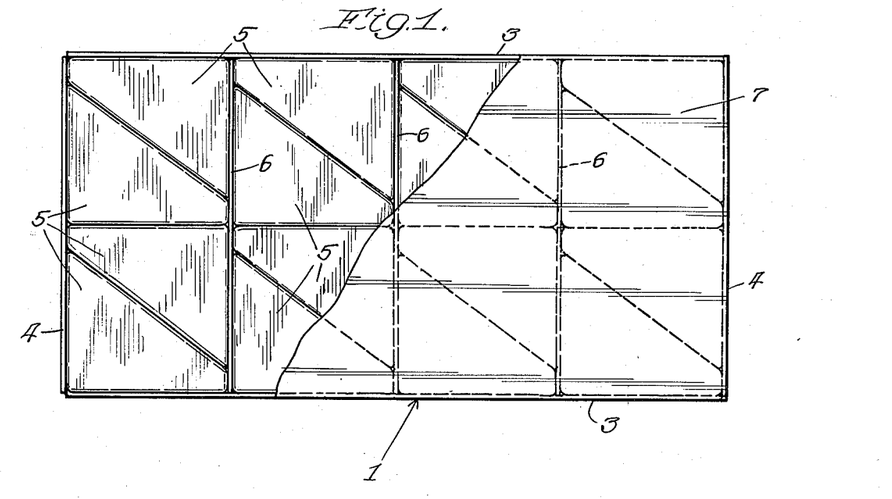
Figure 1 is a plan view of the inner component of a shipping package containing a plurality of units of wrapped cheese to be treated and prepared by the improved apparatus, with a portion of the top or cover broken away.
Figure 2:
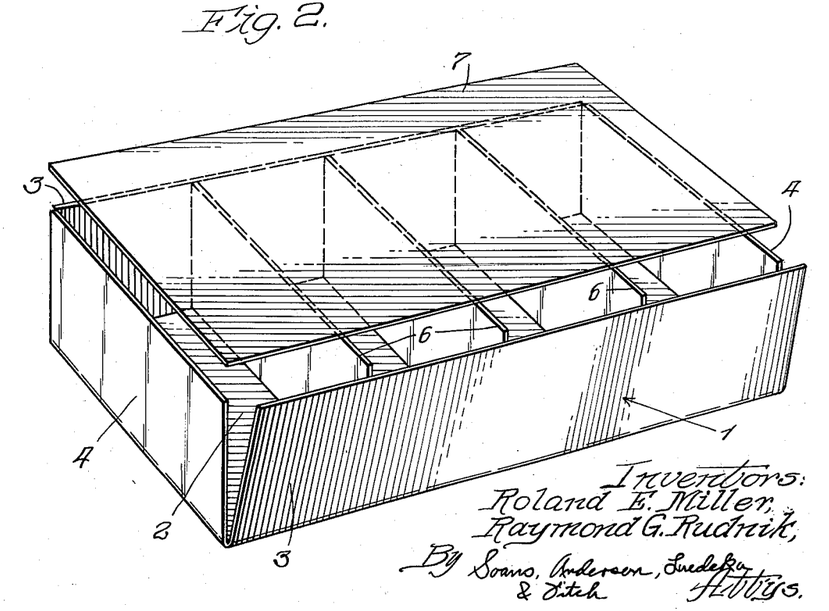
Figure 2 is an exploded perspective illustration of the elements which enter into the preparation of the inner box shown in Figure 1.
Figure 5:
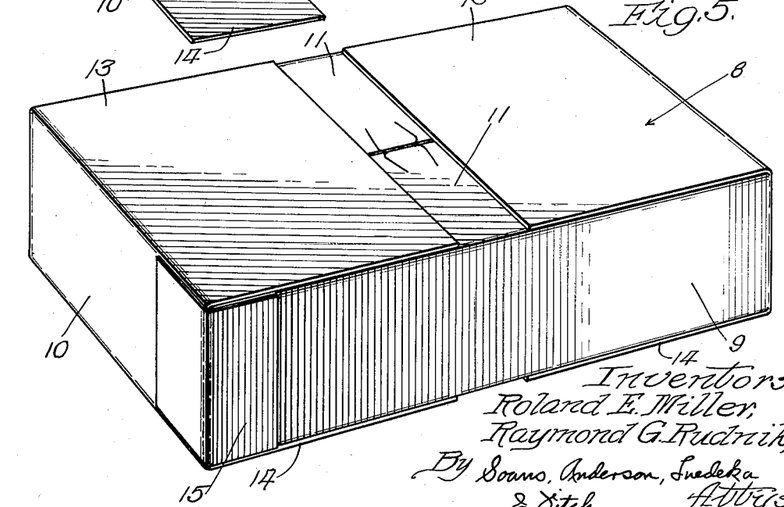
Figure 5 is a perspective illustration of the completed package made ready for shipment after having been vacuum and pressure treated in the improved apparatus.

In the drawings, Figures 1 and 2 illustrate an inner box of the completed cheese package shown in Figure 5. This inner box comprises a generally rectangular receptacle member 1, which is preferably made of corrugated paper board, including a bottom panel 2, side wall flaps 3—3, and end wall flaps 4—4. The side and end walls are preferably formed integrally with the bottom panel 2 and are hingedly connected to the latter along score lines. The side wall panels 3 and 4 are folded upwardly relative to the bottom wall to form the rectangular receptacle seen in the drawings.

A plurality of wedges 5 of cheese wrapped in a flexible wrapper, preferably of a very thin and limp plastic material such as "saran," are assembled as shown in Figure 1 to form rectangular units each containing two wrapped wedges of cheese. The receptacle 1 is, in this instance, of such size that two pairs of cheese wedges 5 may be assembled side by side across the width of the receptacle and four pairs assembled side by side in the direction of the length of the receptacle. Thin, transverse partitions 6, preferably of wood, extend crosswise of the receptacle between adjacent pairs of cheese wedges, but it is preferable to omit any such separation between the transversely aligned pairs as represented in Figure 1. When the inner receptacle 1 is filled as illustrated in Figure 1, a cover member 7 is applied. This cover member is of a size to correspond with the length and breadth of the filled receptacle 1 and is preferably merely placed on top of it without attachment thereto. However, if desired, the cover 7 may be attached to the receptacle 1 by adhesive tape or the like, or said cover may be integral with the receptacle, for example by being hingedly connected to the upper edge of one of the side walls 3 so as to be foldable to closed position over the top of the receptacle. It is preferred, however, that whatever the construction, the receptacle 1, even when closed by the cover 7, should remain sufficiently open to permit air to be withdrawn from within the receptacle, so that any air between the cheese wedges and their wrappers may be withdrawn. In this latter respect, it should be understood that the individual cheese wedges are simply wrapped without bonding or sealing the wrapper. Of course, other arrangements whereby air may be withdrawn from the wrapped cheese may be used.

Figure 4:
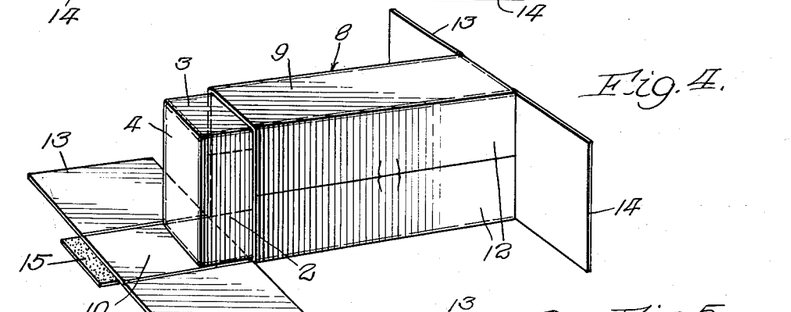
Figure 4 is a perspective view, illustrating the manner of erecting and filling the outer carton.

The filled inner carton is enclosed in an outer receptacle or shipping container indicated at 8 in Figures 4 and 5. This outer container 8 is also preferably, but not necessarily, made of corrugated paper board which is cut and scored to form a foldable blank having a pair of side walls 9—9, a pair of end walls 10—10, side wall top and bottom flaps 11 and 12, respectively, foldably connected to the top and bottom edges of the side walls 9, and top and bottom wall flaps 13 and 14, respectively, hingedly connected to the top and bottom edges of the end wall panels 10.

Figure 3:
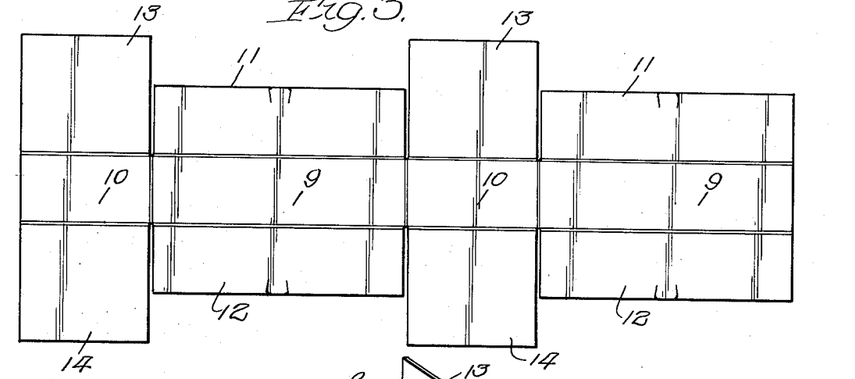
Figure 3 is a plan view, reduced in scale, of a blank of an outer carton, usually made of corregated paper board, in which the inner box of Figure 1 is enclosed for treatment and shipping purposes.

As represented in Figure 4, the carton blank of Figure 3 is folded to provide the receptacle 8 into which the filled inner carton 1 may be inserted to provide the completed package shown in Figure 5. In the described embodiment, the package is completed by bonding the flaps 13 and 14 to the top and bottom of the outer carton. Preferably, this is done with a slow setting glue placed on the inner faces of the flaps 13 and 14, so that the final bonding is achieved after the air is evacuated from the wrapped units in the manner to be described. The free end wall 10 is preferably additionally secured to the adjoining side wall 9 by an adhesive tape 15, as seen in Figure 5, which serves to seal the open edge at the juncture of these two walls. Of course, a similar result can be attained by providing an additional end tab for the one end wall 10, which tab would then be placed in overlapping to the side wall 9 seen in Figure 4 and glued thereto.

The outer carton 8 is made of such size that the filled inner box will be a free fit therein, although not capable of significantly shifting about within such outer carton. A free fit is desired in order that the outer carton, in the initial stages of the operation of the package treating apparatus to be described, permits air to be withdrawn from both said outer and inner receptacles for the purpose already indicated. Of course, other forms of packaging may be employed, and the packaging described herein is intended only as being typical of packaging which may be treated by the apparatus of this invention.

In the package treating apparatus which is about to be described, a plurality of package units 8, such as that shown in Figure 5, are assembled together and simultaneously subjected to compressive forces and vacuum. The apparatus which is illustrated in the drawings is designed to act simultaneously on ten packages 8 assembled in face-to-face relation, as indicated by the broken lines in Figure 9. The apparatus may, of course, be designed to handle any number of packages and the packages may be disposed in the machine in ways other than that indicated.

Figure 8:
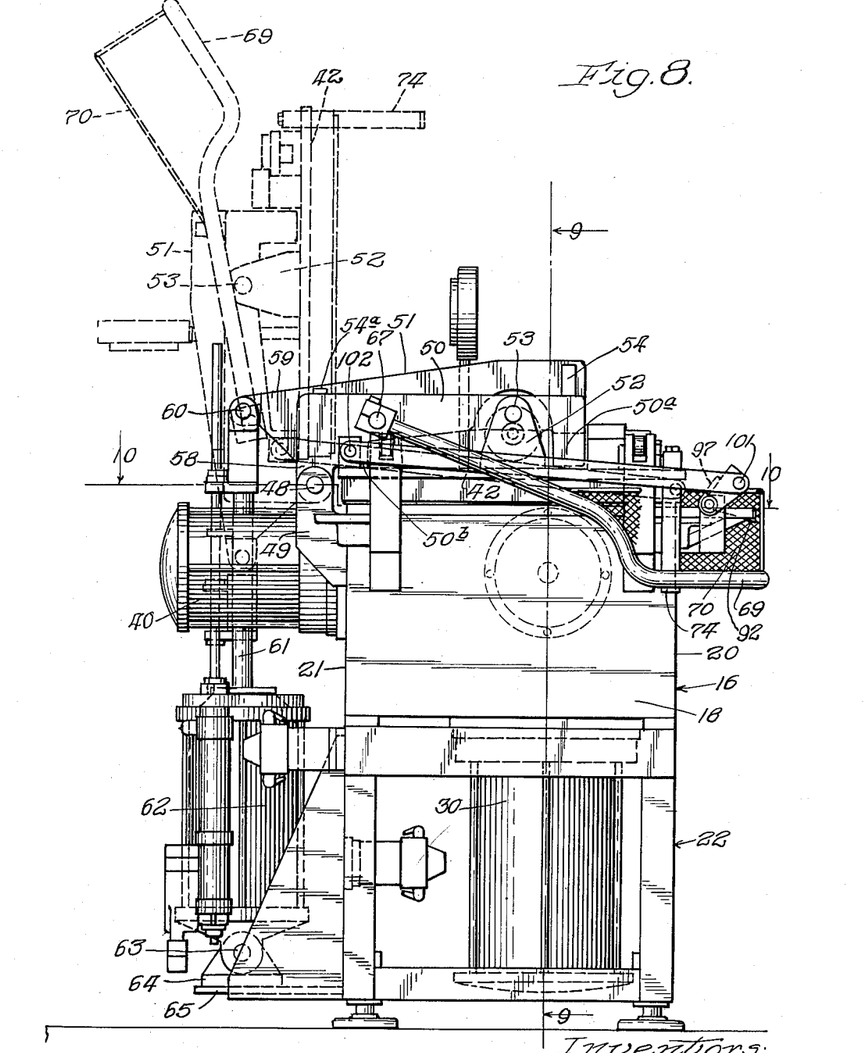
Figure 8 is a view taken from the left end of the apparatus, as shown in Figures 6 and 7.

The apparatus herein shown in Figures 6–13 comprises a main box or treating chamber indicated at 16, which is preferably of sturdy metal construction. The box or chamber 16 has an open top, a bottom wall 17, end walls 18 and 19, and front and back walls 20 and 21 (Fig. 8). This open-top chamber 16 is suitably supported on a base or frame structure 22 so as to be at suitable working height from the floor.

The chamber 16 is provided with an elevator bottom 23 (Fig. 9) supported by a rigid frame structure 24 which, near its opposite ends, is connected as indicated at 25 and 26 to the upper ends of a pair of pneumatic or hydraulically operated piston rods 27 and 28, respectively. These piston rods 27 and 28 are connected to pistons within pneumatic or hydraulic cylinders 29 and 30, respectively, of suitable construction and to which a suitable source of pressure fluid (not shown) is connected for actuating the pistons and piston rods 27 and 28. In this latter respect, it will be understood that each of the fluid-operated cylinders used in the described machine are of the double-acting type and are suitably connected through valves and piping for selective operation through the introduction of pressure fluid to one end of the cylinder. The manner of sequentially operating the various cylinders is described hereinafter and, since any suitable known arrangement for interconnecting the several cylinders with a source of pressure fluid may be used, it is believed unnecessary to provide details of this portion of the described machine.

At one end of the vacuum chamber 16 there is provided a horizontally movable end wall 31 (Fig. 9) which is mounted on one end of a piston rod 32, the latter being connected to a piston within a pneumatic or hydraulic cylinder 33 of suitable construction. A suitable source of pressure fluid is connected in an appropriate manner to the cylinder 33 to effect inward and outward movement of the piston 32 and the end pressure plate 31 attached thereto.

In a similar manner, there is provided a rear pressure plate 34 (Fig. 10) which is horizontally movably supported by being connected as indicated at 35 and 36 to the free ends of piston rods 37 and 38. These piston rods 37 and 38 are connected to pistons within pressure cylinders 39 and 40, which are also connected to suitable sources of fluid pressure for actuating the pistons and the rear pressure plate 34 connected thereto.

A cover for the chamber 16 is mounted for pivotal movement about an axis located adjacent the back of the chamber 16, to thereby afford opening and closing of the chamber. This cover is designated in its entirety by the reference numeral 41 (Fig. 9), and it comprises a main or top plate 42 which is of a size to overly the upper edges of the sides of the chamber 16. The top plate 42 is provided with a depending marginal frame 43, which is suitably recessed to receive and hold a compressible gasket 44 disposed along the upper edges of the side walls of the vacuum chamber 16.

Figure 9:
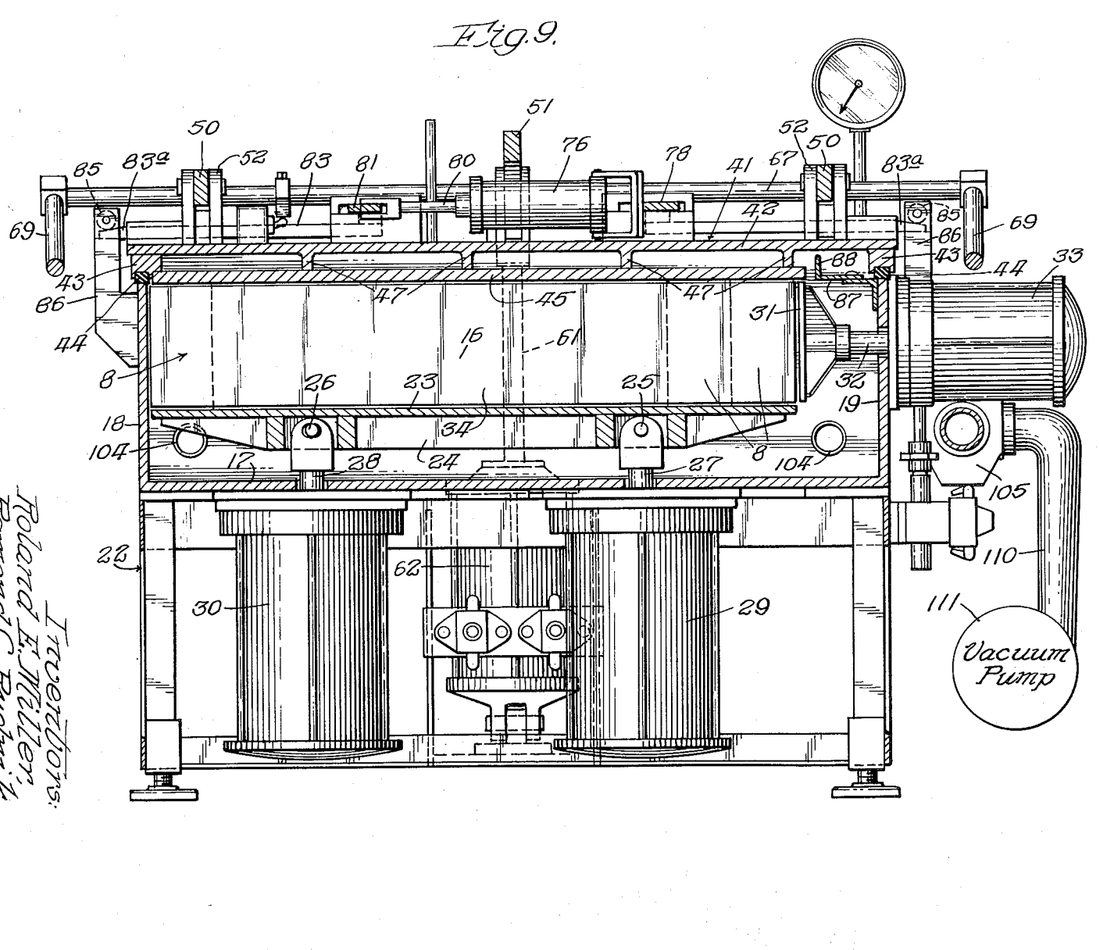
Figures 9 and 10 are vertical sections respectively on the lines 9—9 and 10—10 of Figure 8.
Figure 10:
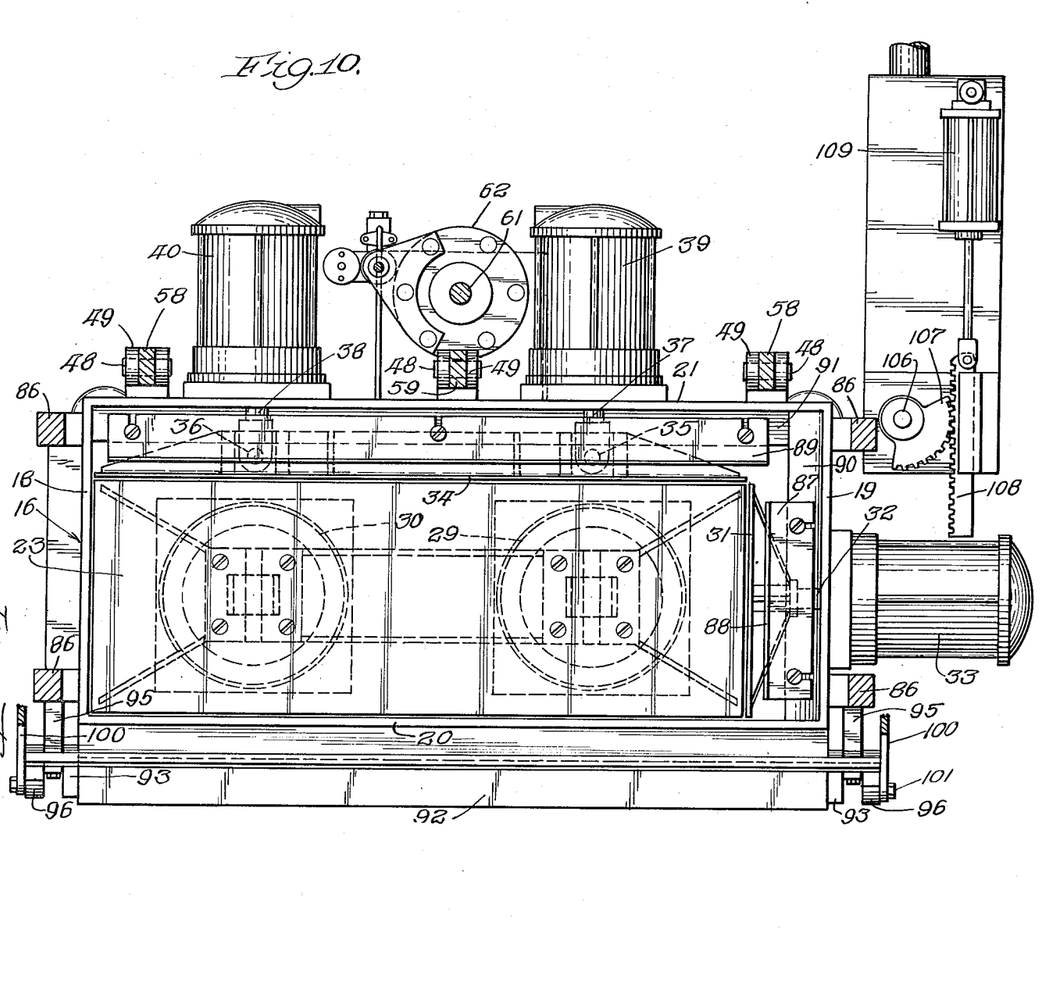

The main cover plate 42 is provided with an auxiliary or inner cover plate 45, which is spaced downwardly from the main cover and rigidly connected to the latter through the agency of suitable spacing ribs or bars 47. The latter are welded to the cover member 41 and the inner cover member 45 is suitably bolted to these spacer bars 47. The inner cover member 45 is disposed opposite to the movable bottom member 23 and is of approximately the same length and breadth as said movable bottom member.

The cover structure 41 is mounted for rocking movement from open to closed position and vice versa about a pivot 48 (Figs. 8 and 10), which is provided by a series of pins suitably mounted in bifurcated brackets 49 which are welded or otherwise rigidly secured to the back wall 21 of the chamber 16. In this connection, a pair of arms or brackets 50 adjacent the opposite ends of the cover (see Figs. 6–9) and an intermediate arm or bracket 51 located about midway of the cover provide a connection between the cover and the pivot pins 48. The end brackets 50 are each connected to the main cover 42 through the agency of an upstanding clevice 52 to which the arms 50 are pivotally connected by pivot pins 53. The outer or front ends of the arms 50–50 and 51 are rigidly interconnected by means of a longitudinal lengthwise extending bar 54, and the rearward ends of these arms are similarly interconnected by a bar 54a. Suitable corner braces 55 and 56 are employed in the corners formed at the intersections of the arms 50 and 51 respectively, with the bar 54. Similarly, braces 55a and 56a are employed with respect to bar 54a. The forward lower portion of the central bar 51 is recessed as indicated at 57 (Fig. 8) so as to clear a pressure cylinder which will hereinafter be further referred to.

Each of these brackets 50, 50 and 51 have a depending rear end portion, indicated at 58 (Fig. 8), which is journalled on the associated pivot pin 48. The central bracket 51 is extended rearwardly of the cover structure 41, as indicated at 59, and is pivotally connected, as by a pin 60, to the upper end of a piston rod 61 which extends downwardly into a pneumatic or hydraulic cylinder 62. The piston rod 61 is, of course, equipped with a piston within the cylinder 62 and said cylinder 62 is pivotally anchored at its lower end, as indicated at 63, on a suitable anchor bracket 64 mounted on a base plate 65 carried by the supporting stand or base 22 of the apparatus. When pressure fluid is admitted to the upper end of the cylinder 62, the piston rod 61 is moved downwardly to act through the central bracket 51 to rock the cover from the closed position in which it is shown in full lines in Figure 8 to the open position shown in broken lines, the movement being about the pivot 48.

It will be seen that the rigid frame structure comprising the members 50, 51, 54 and 54a which support the top cover for the vacuum chamber 16 is rockable about the pivots 48, and that said frame structure is pivoted to the cover 42 by the pivot pins 53 so that rocking movement of the frame will be transmitted to the cover. The cover is permitted a small degree of rocking movement on the pivot pins 53 relative to the supporting frame structure so that certain cover locking elements presently to be described may control the pressure with which the cover 42 is applied to the chamber. To this end, the arms 50, 50 and 51 are provided with depending front end elements, such as are indicated at 50a in Figure 8, and the rearward portions of the arms 50—50 are provided with similar depending lug portions 50b. These lug portions 50a and 50b do not necessarily engage the top of the cover 42 when it is in locking position, but they serve to prevent excessive rocking of the cover about the pivots 53 when it is moved to its open position.

A shaft 67 extends lengthwise of the cover 42 along the rearward edge thereof, and this shaft is journalled in the brackets 50, 51 and 50 and held against endwise shifting by means of collars 68. The shaft 67 extends beyond the opposite ends of the cover plate and has fixed thereto a U-shaped rod 69 having its bight portion disposed along the forward side of the machine and including an upstanding wire mesh or similar fence 70 forming a guard around certain working elements which will presently be described. When the cover 41 is swung upwardly to open position (see Fig. 8), the shaft 67 will, of course, rock upwardly about the pivot pin 48 of the cover and carry the U-shaped frame 69 and guard 73 upwardly about the pivot axis 48. More particularly, the cover 41 is provided at its opposite ends with depending brackets 74 and these brackets have laterally projecting leg portions which underlie adjacent sections of the U-shaped rod 69. Accordingly, as the cover 41 is swung upwardly the bracket 74 will act to swing the outer portion of the guard structure upwardly with the cover.

From the open position illustrated in broken lines in Figure 8, the cover structure 41 is swung to closed position incident to upward movement of the piston rod 61. When the cover reaches its closed position, air under pressure is delivered to a pneumatic cylinder 76 (Fig. 6) which overlies the cover. One end of the cylinder 76 is pivoted to a bracket 77 which is fixedly supported on a cross arm 78 extending transversely of the chamber cover. The ends of the cross arm 78 are slidable in slot forming brackets 79 which are fixed to the top of the cover member 42. The piston rod 80 of the cylinder 76 is pivoted to a cross arm 81 which has its opposite ends slidable lengthwise of the cover in slot forming brackets 82. Locking bars 83 are pivotally connected respectively to the ends of the cross arms 77 and 81 outwardly of the slot forming brackets 79 and 82, and these locking bars 83 extend beyond the opposite ends of the cover 41 and are slidable through suitable guide brackets 84 secured to the cover 41 adjacent its four corners.

Outer end portions 83a (Figs. 9 and 13) of the respective locking bars 83 are adapted to move under rollers 85 which are journalled in the bifurcated upper end portions of brackets 86 secured to the end walls 18 and 19 of the chamber 16. The upper surfaces of said end portions 83a of the locking bars are suitably inclined, so that outward movement of the respective locking bars serves to cooperate with the associated rollers 84 to cam the cover downwardly into air tight sealing engagement with the upper edges of the walls of the chamber, the gaskets 44 serving to facilitate the production of an air tight seal.

The operating cylinder 76 more or less floats on its connections to the cross members 78 and 81, and it will be seen that, when the piston rod 80 is forced outwardly, the cross members 78 and 81 will be moved toward the ends of the vacuum chamber 16 to effect locking of the cover on the chamber. Conversely, when the piston rod 80 is retracted, the cross members 78 and 81 will be moved toward the center of the cover to withdraw the locking bars 83 so as to release the cover for opening. It should be noted particularly that the arrangement shown provides an equalization of locking pressure at the four corners of the cover 41, as an incident to the pivotal connection of the cross arms 78 and 81 to the cylinder 76 and piston rod 80, respectively, as well as the pivotal connections between the locking bars 83 and the cross arms. By this means, uniform locking pressure will be applied at the four corners of the cover 41, so that substantially uniform sealing pressure will be applied to the gasket 44 around the entire periphery of the chamber.

In the operation of the machine, the chamber 16 is loaded with a plurality of packages 8 of the character illustrated in Figure 5, the packages being placed on edge, as represented in Figure 9, on the movable bottom plate 23. During the loading of the chamber, the bottom plate 23 is elevated to a position in which its top surface is substantially level with the upper edges of the side walls 18, 19, 20 and 21 of the chamber. At that time, the end pressure member 31 and the back pressure member 34 are fully retracted to provide a maximum area in the chamber as defined by these members and the walls 18 and 20. The end pressure member 31 will then be located beneath an angle member 87 (Figs. 9 and 10) having an upstanding guide flange portion 88, which serves to guide the cheese packages 8 into place on the bottom member 23 in such relationship to the member 31 that the latter will not interfere with lowering of the cheese packages with the bottom member 23. Similarly, an angle-formed guide element 89 is associated with the rear pressure member 34 to prevent the cheese packages from overlapping the retracted pressure member 34 during loading of the chamber. The guide members 87 and 89 may be advantageously mounted on angle members 90 and 91, respectively, which are suitably fixed on the adjacent end and back walls of the chamber 16, and preferably the horizontal flanges of the guide members 87 and 89 are slotted to adjustably fit under clamping screws threaded into the supporting members 90 and 91, as illustrated in said Figs. 9 and 10.

Figure 12:
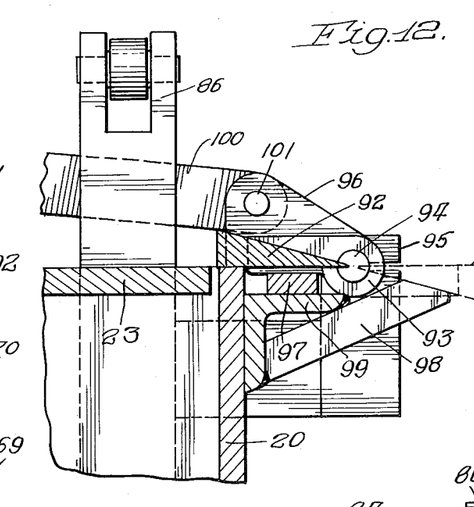
Figure 12 is a section corresponding to Figure 11, with parts omitted and showing a changed position of certain of the elements.
Figure 13:
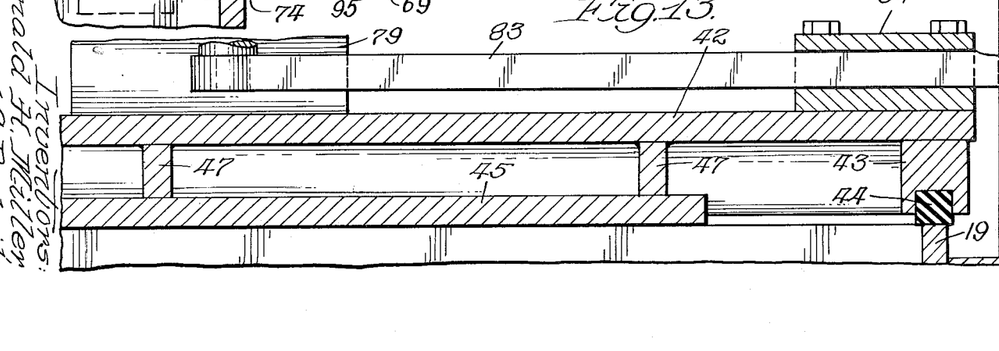
Figure 13 is an enlarged section on the line 13—13 of Figure 6.

To further facilitate loading of the chamber with cheese packages 8, there is provided a loading guide 92 which extends along the length of the front wall 20 of the chamber 16, this member being preferably wedge shape in cross-section, as best shown in Figures 11 and 12. The loading guide member 92 is secured at its opposite ends to suitable brackets 93 which are pivotally mounted on pivot pins 94 carried by suitable brackets 95 fixed on the adjacent cover locking brackets 86. Mechanism for automatically rocking the loading guide 92 about the axis of pins 94, from the operative position shown in Figure 12 to the inoperative position shown in Figure 11, is provided.

This rocking mechanism for the guide 92 comprises at each end of the vacuum chamber structure, rock arms 96 which are also fixed to the pivot pins 94 outwardly of the brackets 95. These rock arms 96 are rigidly interconnected by means of a longitudinal bar 97 which extends across the length of the vacuum chamber slightly below the loading guide bar 92, as shown in Figure 12. By rocking the arms 96 together with the bar 97 clockwise about the pivot pins 94, the bar 97 will engage the wedge-shaped loading guide 92 and rock it upwardly and outwardly to an extent sufficient to cause the loading guide 92 to fall by gravity to the inoperative position shown in full lines in Figure 11. In its inoperative position, the loading guide 92 is supported by suitable fixed stops 98 which are welded or otherwise suitably secured to an angle member 99 extending along and secured to the front of the chamber 16 adjacent the top thereof.

For automatically rocking the arms 96 and the cross member 97 so as to displace the loading guide 92 when the cover is being closed, thrust links 100 are provided at the ends of the structure. The front ends of these thrust links are pivotally connected, as indicated at 101, (Fig. 6), to the rock arms 96, and the rear ends of said thrust links are pivotally connected at 102 to upstanding lugs 103 provided on the rear corners of the cover structure. By reference to Figure 8 it will be seen that the pivot connection 102 between the thrust link 100 and the cover 41 is so located with reference to the cover hinge axis 48 that opening movement of the cover will cause the thrust link 100 to be drawn rearwardly, whereby the rock arms 96 and cross member 97 are moved counter-clockwise from the inoperative position shown in Figure 11 to the operative position shown in Figure 12. Upon closing movement of the cover 41, said thrust link 100 will be moved forwardly to effect forward or clockwise rocking movement of the rock arms 96 and the cross member 97, to thereby effect movement of the loading guide 92 from the operative position shown in Figure 12 to the inoperative or retracted position shown in Figure 11.

The guard screen 70 encloses the area of operation of the loading guide 92 and the rock arms 96 and cross member 97, as shown in Figure 11. Shortly after closing movement of the cover structure 41 starts, the guard will fall by gravity to its normal relationship to the cover structure as determined by the supporting brackets 74, so that as the cover comes down, said guard structure will enclose the said operating elements.

Figure 14:
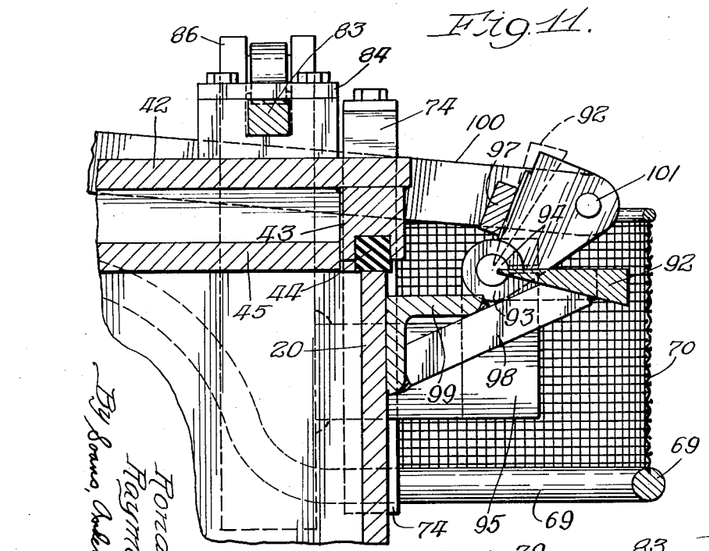
Figure 14 is a timing diagram illustrating the operation of the selected embodiment.

After the required number of cheese packages are delivered into position on the elevated bottom member 23, the mechanism is ready for a cycle of operation. To start the operation, an electrical switch (not shown) is closed to actuate the mechanisms which control movement for various parts of the device. Various types of control elements, for example, cam control electric switches may be operated in the required sequence to effect the desired sequence of operation of the vaccumizing and compressing chamber. In this respect, Figure 14 illustrates a suitable timing cycle for cam controlled micro-switches (1—14) for actuating the various operating mechanisms. As indicated in Figure 14, the first five seconds of operation after completing loading of the chamber are taken up while the starting switch button is held closed to insure establishment of complete automatic operation of the control cams or other devices. This initial period represents substantially 6° of rotation of a master cam shaft by which the various operations are controlled. During the next period of 15 seconds, occupying approximately 18° of rotation, the bottom plate 23 is lowered from its elevated loading position as shown in Figure 12 to its fully lowered position which is approximately as represented in Figure 9. This lowering of the bottom plate 23 is, of course, effected by delivering compressed air or other fluid into the upper portions of the operating cylinders 29 and 30 to thereby drive the pistons therein downwardly. When the bottom plate 23 reaches its lowermost position, operation of the pistons 29 and 30 is cut off so that the bottom plate 23 will remain stationary in said lowered position. This lowering of the bottom plate 23 serves also to lower the cheese packages thereon to a position such that they will be fully contained within the confines of the chamber 16.

The next step is to close the cover structure 41, this movement occupying about 20 seconds time and about 24° of the master cam rotation, as represented in the diagram in Figure 14. This cover closing is effected by delivering pressure fluid to the lower portion of the piston 62 whereby its piston rod 61 is moved upwardly (Fig. 8) so as to rock the cover carrying frame and the cover 42 from the open position shown in dotted lines to the closed position shown in full lines in Figure 8. The closing movement effected by the cylinder 62 does not clamp the cover 42 in place, but merely delivers the cover to a position of rest on the upper edges of the walls of the chamber 16.

Figure 6:
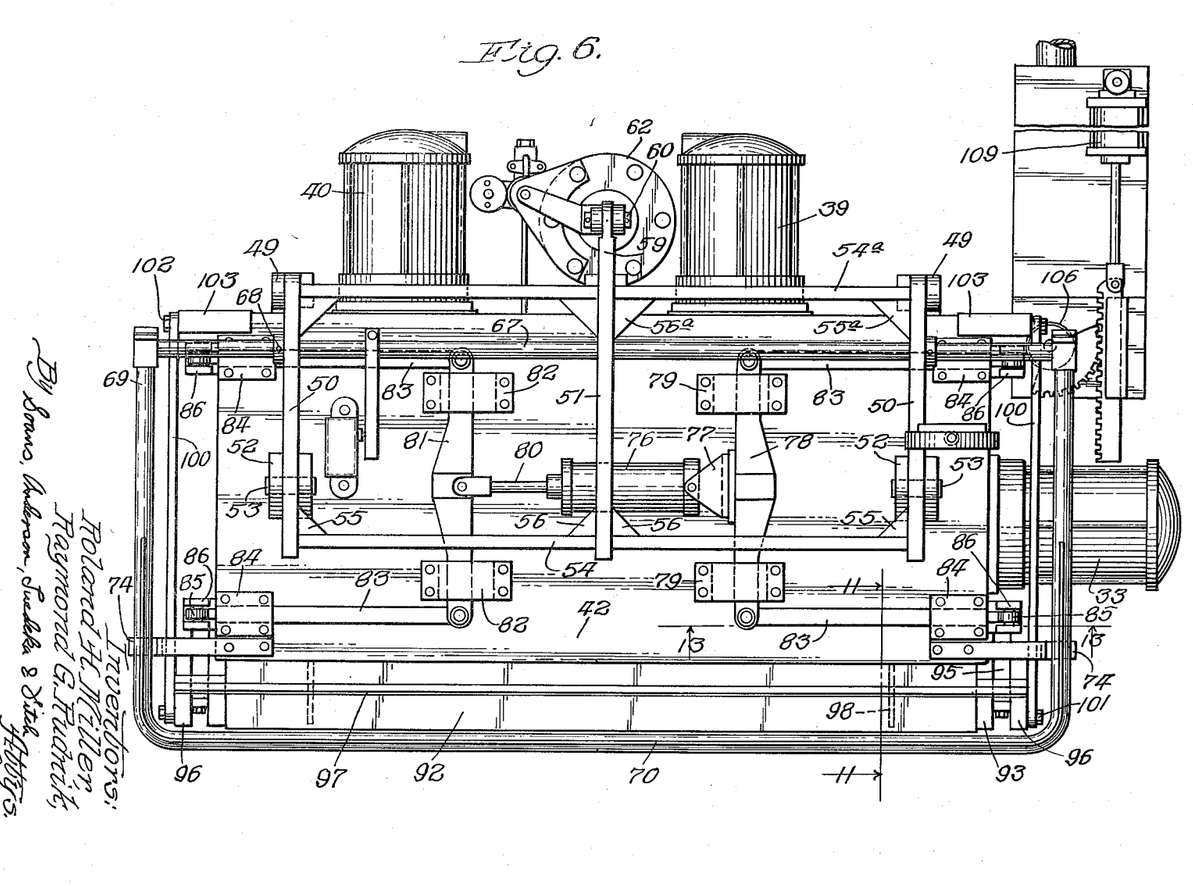
Figures 6 and 7 are plan and front elevations, respectively, of the improved apparatus.
Figure 7:
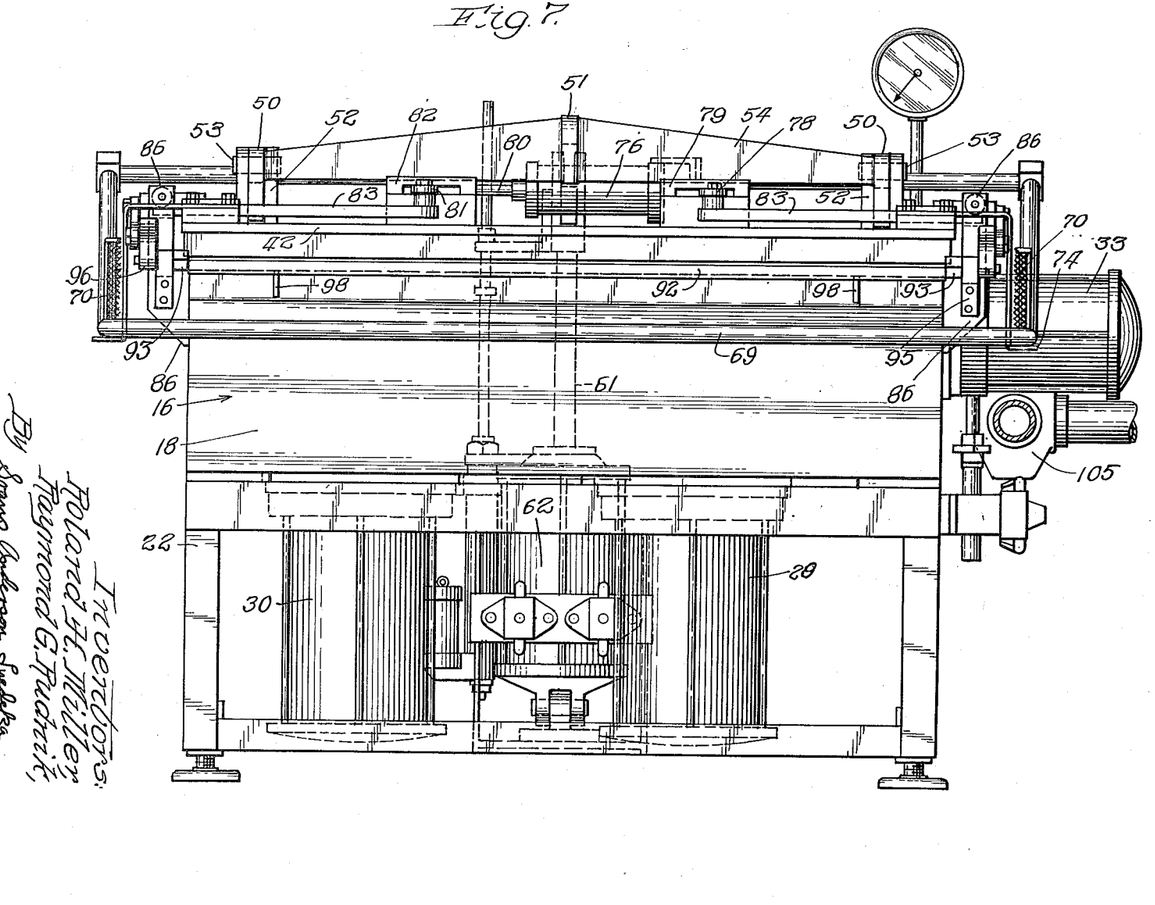

The next step of the operation is to actuate the cover locking bars 83 by delivering pressure fluid into the cylinder 76 on top of the cover structure. This will serve to clamp the cover 42 into an air tight sealing engagement with the upper edges of the receptacle walls, the gasket 44 being incidentally compressed to obtain the desired air tight seal. During this cover locking operation the chamber 16 is connected to a vacuum pump (not shown) so as to withdraw air from the chamber. In Figure 9 vacuum connections to the chamber are indicated at 104, these connections being made through suitable piping to a valve 105 having communication through a pipe 110 with a suitable vacuum pump indicated at 111. This valve 105 has a rotary valve core shaft 106 (Fig. 10) which extends upwardly and carries a gear segment 107 which meshes with a slidably mounting rack 108. The rack bar 108 may be actuated by a suitable fluid pressure cylinder 109 to which the delivery of operating fluid may be suitably controlled and timed to establish the desired communication between the chamber and the vacuum pump and to disconnect such communication at the required times. This cover locking operation takes about 10 seconds and counts for about 12° of the rotary movement of the master cam shaft.

The chamber now is placed under a fairly high degree of vacuum, about 25 inches of mercury in the described embodiment, so that any air entrapped in the wrapped cheese units or in the paperboard carton 8 is readily withdrawn therefrom. This vacuum is held for about 3 to 5 minutes (252° or about 4 minutes in Fig. 14) from the time the cover locking operation begins. After the cover 42 is locked in place on top the chamber 16, the next 6° (5 seconds) is used in moving the end plate 31 into pressure engagement with the cheese packages so as to compress the latter against the fixed end wall 18. In the described embodiment this is accomplished with a pressure of about 35 pounds p.s.i. in the cylinder 33, which pressure is held throughout about 234° of master cam rotation.

Next, the rear plate 34 is moved inwardly against the packages 8 by the pneumatic cylinders 39 and 40 and this movement occupies about 6° of cam rotation (5 seconds). A pressure approximately the same as that for the end wall 31 is used for the rear wall 34. After the rear plate 34 is in its pressure position, the next 6° of cam rotation (5 seconds) is utilized in moving the bottom plate 23 upwardly to press the packages 8 against the cover plate 45, preferably at about 35 pounds p.s.i. as in the case of the other movable panels in the chamber 16. Thus, the packages 8 are exposed to compressive forces on all six sides and this pressure is held for about 222° of cam rotation (approximately 3½ minutes), during which time the chamber 16 is also being subjected to the above described vacuum.

This combination of positive compressive forces on all sides of the packages 8, which are essentially uniform throughout, and a substantial vacuum in the chamber 16 is particularly effective in withdrawing substantially all of the air and other gases from the packages. One of the more important advantages of the described apparatus is that it can efficiently and automatically handle a large volume of packaged units in each operation. Further, such apparatus can successfully evacuate the air simultaneously from a substantial number of packages of cheese or the like in a relatively short period of time. In this latter connection, it should be noted that with the use of commercially available slow-setting glues on the flaps 13 and 14 (Fig. 4) the period of operation of the described apparatus is coordinated with the normal setting time of such glues so that the flaps 13 and 14 are securely bonded in place against panels 11 and 12 when the pressure in chamber 16 is released from the packages. Thus, the packages are taken from the machine in a compressed condition such that the wedges therein are inherently pressed against each other and the carton walls to thereby retain the individual wrappers in tight relation to the wedges. As indicated above, with the described blank for the outer carton 8, the remaining unsealed edge of the carton is covered with adhesive tape 15 after the packages are removed from the chamber 16.

After the vacuum in the chamber 16 and the pressure on the walls 31, 34 and 23 has been held for the period indicated above, the pressure on the end plate 31, rear wall 34 and bottom panel 23 is released and these movable elements are retracted by operation of their associated pneumatic cylinders. This operation occupies 24° (20 seconds time) of the cam rotation. The next 12° of rotation (10 seconds time) is taken up with actuation of pneumatic cylinder 76 to unlock the cover 42. At this time, the valve 105 is also operated, through cylinder 109, to shut off communication between the vacuum pump and the chamber 16. Following this about 15 seconds is taken up (18° rotation) in opening the cover by operation of the pneumatic cylinder 62. The last 5 seconds of operation (6° rotation of the master cam shaft) is used in actuating the cylinders 29 and 30 to move the bottom plate 23 upwardly to position the packages 8 for removal from the machine. The cycle may then be repeated after again loading the chamber 16 with packages 8.

Thus it is seen that there is provided apparatus for effectively treating packaged units, such as wrapped cheese wedges, so as to evacuate the air and other gases from the package and present the wrapped wedges or units in a condition such that they may be stored over a substantially greater period of time than was possible heretofore. More particularly, it will be noted that the novel and very advantageous mode of handling cartons of cheese units, which are individually wrapped in a flexible wrapper, not only serves to compress the cartons in the presence of a negative air pressure or vacuum to thereby evacuate the air from the carton and provide for compacting of the cheese units, but also effects a removal of air between each cheese unit and its wrapper and causes the latter to cling more closely to the cheese unit. Then too, apparatus embodying the present invention is adapted for automatic or semi-automatic operation on a scale enabling its use most advantageously for large scale production operations.

Although shown and described with respect to particular mechanism, it will be apparent that modifications might readily be made without departing from the principles of this invention.

We claim:

1. Apparatus for evacuating gases from paperboard cartons filled with wrapped cheese units, comprising a receptacle adapted to receive a plurality of the cheese-filled cartons arranged in abutting and aligned relation to each other, said receptacle including a bottom plate arranged for vertical movement between the lower and upper level of the receptacle, two pairs of opposing side walls with at least one wall of each of said pairs disposed for movement relative to the opposing side wall in a direction at right angles thereto, a cover adapted for movement to and from a position of sealing engagement with the top edges of said receptacle, vacuum producing means in fluid communication with the interior of said receptacle, means for sequentially moving said bottom plate, movable side walls and cover, so that said cartons are lowered into the receptacle, said top cover is closed in sealing relation to the receptacle so as to exert downward pressure on the cartons, and so that said movable side walls are moved inwardly toward the center of the receptacle to thereby exert a pressure on the four sides of the cartons, means for actuating said vacuum producing means while the cartons are under pressure from said movable side walls and cover, to thereby evacuate air from the wrapped cheese units and the cartons by the simultaneous application of compressive forces and vacuum on the cartons, and means for sequentially halting the fluid communication between the vacuum producing means and the receptacle, retracting the movable side walls to release the pressure on the cartons, opening the cover, and for elevating said movable bottom plate to thereby move the cartons to the upper level of the receptacle in position for removal.

2. Apparatus for evacuating gases from paperboard cartons filled with cheese units individually wrapped in a limp, flexible material, said apparatus comprising a receptacle adapted to receive a plurality of the cartons arranged in abutting and aligned relation to each other so as to nearly fill the receptacle, said receptacle including a movable bottom plate arranged for vertical movement between the lower and upper level of the receptacle, two pairs of opposing side walls with at least one wall of each of said pairs disposed for movement relative to the opposing side wall in a direction at right angles thereto, and said receptacle including a cover adapted for movement to and from a position of sealing engagement with the top edges of the sides of said receptacle, means for locking said cover in said position of sealing engagement with the receptacle, vacuum producing means in fluid communication with the interior of said receptacle, means for sequentially moving said bottom plate, movable side walls, cover and cover locking means, so that said cartons are lowered into the receptacle, said top cover is closed and locked in sealing relation to the receptacle in a manner affording a downward pressure on the tops and bottoms of the cartons, and so that said movable side walls are moved inwardly toward the center of the receptacle to thereby exert a pressure on the four sides of the cartons, means for actuating said vacuum producing means while the cartons are under pressure from said movable side walls and cover, to thereby evacuate air from the wrapped cheese units and the cartons by the simultaneous application of compressive forces and vacuum on the cartons, and means for sequentially halting the fluid communication between the vacuum producing means and the receptacle, retracting the movable side walls to release the pressure on the sides of the cartons, unlocking and opening the cover, and for elevating said movable bottom to thereby move the cartons to the upper level of the receptacle in position for removal from said apparatus.

3. Apparatus for evacuating gases from paperboard cartons filled with individually wrapped cheese units by compressing the cartons in the presence of a vacuum, said apparatus comprising a frame structure, a vacuum chamber supported on said frame and including a bottom, a pair of side walls, and a pair of end walls defining a generally rectangular, open-top chamber, a vertically movable bottom plate in said chamber, means carried by said frame and connected with said bottom plate in a manner affording vertical movement of said bottom plate, an end plate in said chamber which is adapted for movement inwardly of said chamber to and from a position parallel and adjacent to one of said end walls, means on said frame connected with said end plate for effecting said movement thereof, a side plate in said chamber adapted for movement inwardly of said chamber to and from a position parallel and adjacent to one of said side walls, means on said frame connected with said side plate for effecting said movement thereof, a cover mounted on said frame for generally vertical swinging movement relative to a position of sealing engagement with the upper edges of said side and end walls, means on said frame connected with said cover and operable to effect said swinging movement thereof, and means for effecting sequential movement of said bottom plate, cover, end and side plates so as to seal said chamber and exert compressive forces uniformly on all sides of cartons disposed within the chamber, and a vacuum producing means adapted for fluid communication with said chamber, while said compressive forces are being exerted on the cartons in the chamber, whereby gases are evacuated from the cartons through the simultaneous application of compressive forces and vacuum on the cartons.

4. Apparatus for evacuating gases from paperboard cartons filled with individually wrapped cheese units by compressing the cartons in the presence of a vacuum, said apparatus comprising a frame structure, a vacuum chamber supported on said frame and including a bottom, a pair of side walls, and a pair of end walls defining a generally rectangular, open-top chamber, a vertically movable bottom plate in said chamber, fluid-pressure operated means carried by said frame and connected with said bottom plate to provide selective vertical movement of said bottom plate, an end plate in said chamber which is adapted for movement inwardly of said chamber to and from a position parallel and adjacent to one of said end walls, a second fluid-pressure operated means on said frame and connected with said end plate for selectively effecting said movement thereof, a side plate in said chamber adapted for movement inwardly of said chamber to and from a position parallel and adjacent to one of said side walls, a third fluid-pressure operated means on said frame connected with said side plate for selectively effecting said movement thereof, a cover mounted on said frame for vertical swinging movement relative to a position of sealing engagement with the upper edges of said side and end walls, and additional fluid pressure means on said frame connected with said cover and selectively operable to effect said swinging movement thereof, and means for effecting sequential operation of each of said fluid-pressure operated means to provide sequential movement of said bottom plate, cover, end and side plates, so as to seal said chamber and exert compressive forces uniformly on all sides of cartons disposed within the chamber, and a vacuum producing means selectively connectable in fluid communication with said chamber, while said compressive forces are being exerted on the cartons in the chamber, whereby gases are evacuated from the cartons through the simultaneous application of compressive forces and vacuum on the cartons.

References Cited in the file of this patent

UNITED STATES PATENTS

| | | |
|---|---|---|
| 1,992,821 | Gere | Feb. 26, 1935 |
| 2,481,611 | Moore | Sept. 13, 1949 |